United States Patent
Kim et al.

(10) Patent No.: US 9,854,495 B2
(45) Date of Patent: Dec. 26, 2017

(54) RADIO LINK FAILURE REPORTING IN A SYSTEM USING MULTIPLE CELLS

(71) Applicant: LG Electronics Inc., Seoul (KR)

(72) Inventors: Sangwon Kim, Seoul (KR); Sunghoon Jung, Seoul (KR); Youngdae Lee, Seoul (KR); Sungjun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 99 days.

(21) Appl. No.: 14/650,934

(22) PCT Filed: Jan. 9, 2014

(86) PCT No.: PCT/KR2014/000239
§ 371 (c)(1),
(2) Date: Jun. 10, 2015

(87) PCT Pub. No.: WO2014/109565
PCT Pub. Date: Jul. 17, 2014

(65) Prior Publication Data
US 2015/0373609 A1 Dec. 24, 2015

Related U.S. Application Data

(60) Provisional application No. 61/751,278, filed on Jan. 11, 2013, provisional application No. 61/753,437, filed on Jan. 17, 2013.

(51) Int. Cl.
*H04W 36/30* (2009.01)
*H04W 16/24* (2009.01)
(Continued)

(52) U.S. Cl.
CPC ......... *H04W 36/30* (2013.01); *H04W 16/24* (2013.01); *H04W 36/0044* (2013.01);
(Continued)

(58) Field of Classification Search
CPC ............. H04W 36/04; H04W 36/0044; H04W 36/006108; H04W 36/28; H04W 36/30;
(Continued)

(56) References Cited

U.S. PATENT DOCUMENTS 9,042,315 B2 * 5/2015 Lin ................... H04W 36/30
370/242
9,344,234 B2 * 5/2016 Lin ................... H04W 36/30
(Continued)

OTHER PUBLICATIONS

International Search Report issued in corresponding International Patent Application No. PCT/KR2014/000239 dated Apr. 29, 2014, Nov. 9, 2016.
(Continued)

*Primary Examiner* — Warner Wong
(74) *Attorney, Agent, or Firm* — Morgan, Lewis & Bockius LLP

(57) ABSTRACT

Radio link Failure (RLF) reporting operation in a wireless communication system using multiple cells is disclosed. According to this operation, when a first cell and a second cell are simultaneously connected to a UE and the first cell and the second cell are of different base stations (a first base station and a second base station respectively), if the RLF with the UE on the first cell is detected by the first base station, the first base station may transmits an indication of the RLF with the UE on the first cell to the second base station.

12 Claims, 10 Drawing Sheets

(51) Int. Cl.
  *H04W 36/28* (2009.01)
  *H04W 36/00* (2009.01)
  *H04W 36/04* (2009.01)
  *H04L 12/58* (2006.01)

(52) U.S. Cl.
  CPC ........... *H04W 36/04* (2013.01); *H04W 36/28* (2013.01); *H04L 51/30* (2013.01)

(58) Field of Classification Search
  CPC ..... H04W 16/24; H04W 76/00; H04W 28/04; H04L 12/2623; H04L 12/2639; H04L 12/5875; H04L 43/06
  See application file for complete search history.

(56) References Cited

U.S. PATENT DOCUMENTS

| | | | | |
|---|---|---|---|---|
| 9,674,757 | B2* | 6/2017 | Yiu | H04W 36/30 |
| 2011/0117908 | A1 | 5/2011 | Huang et al. | |
| 2011/0207485 | A1 | 8/2011 | Dimou et al. | |
| 2012/0057527 | A1* | 3/2012 | Ou | H04W 36/0094 370/328 |
| 2012/0147772 | A1* | 6/2012 | Kazmi | H04L 5/0078 370/252 |
| 2012/0236707 | A1 | 9/2012 | Larsson et al. | |
| 2012/0281548 | A1 | 11/2012 | Lin et al. | |
| 2012/0309398 | A1 | 12/2012 | Watanabe | |
| 2012/0327797 | A1* | 12/2012 | Siomina | H04W 36/30 370/252 |
| 2013/0005330 | A1* | 1/2013 | Han | H04W 36/08 455/424 |
| 2013/0208601 | A1* | 8/2013 | Cui | H04W 24/10 370/252 |
| 2014/0112155 | A1* | 4/2014 | Lindoff | H04W 24/08 370/242 |
| 2014/0148174 | A1* | 5/2014 | Teyeb | H04W 36/0083 455/441 |
| 2015/0024757 | A1* | 1/2015 | Bulakci | H04W 36/0016 455/437 |
| 2015/0092746 | A1* | 4/2015 | Jang | H04W 24/08 370/331 |
| 2015/0117183 | A1* | 4/2015 | Heo | H04W 36/0055 370/228 |
| 2015/0181479 | A1* | 6/2015 | Lin | H04W 36/0061 370/331 |
| 2015/0195762 | A1* | 7/2015 | Watanabe | H04W 36/0083 455/436 |
| 2015/0237514 | A1* | 8/2015 | Maeda | H04W 24/02 370/338 |
| 2016/0183319 | A1* | 6/2016 | Byun | H04W 76/023 370/329 |
| 2016/0242049 | A1* | 8/2016 | Centonza | H04W 24/02 |
| 2016/0337911 | A1* | 11/2016 | Engstrom | H04W 74/002 |
| 2017/0196005 | A1* | 7/2017 | Yang | H04W 72/0413 |

OTHER PUBLICATIONS

International Search Report and Written Opinion issued in corresponding International Patent Application No. PCT/KR2014/000239 dated Apr. 29, 2014.

* cited by examiner

FIG. 3
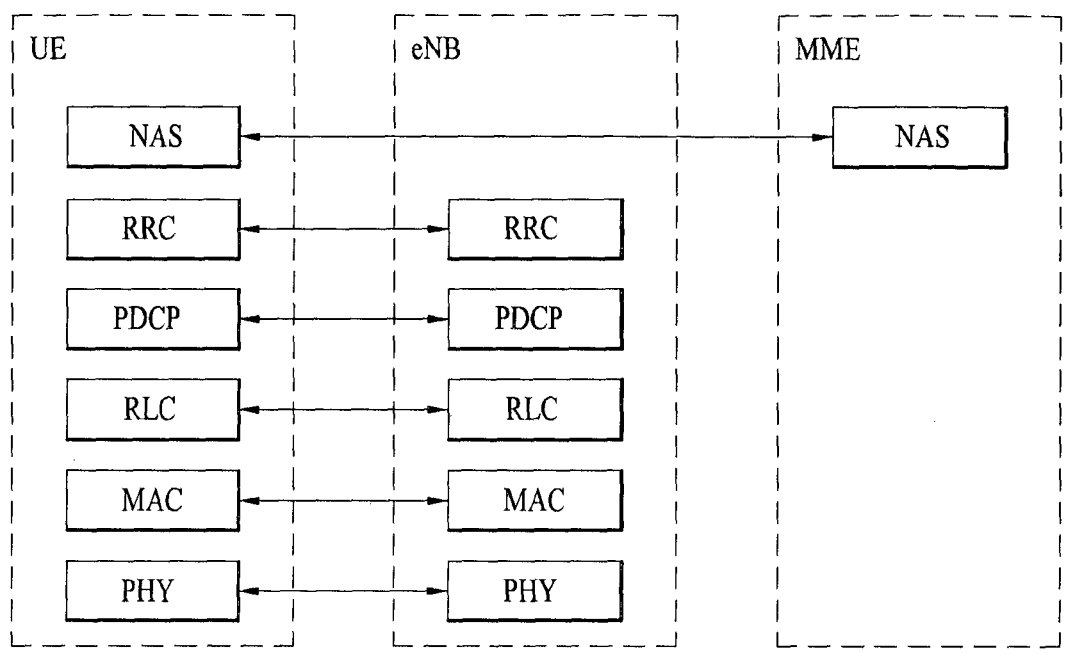
(a) contol - plane protocol stack
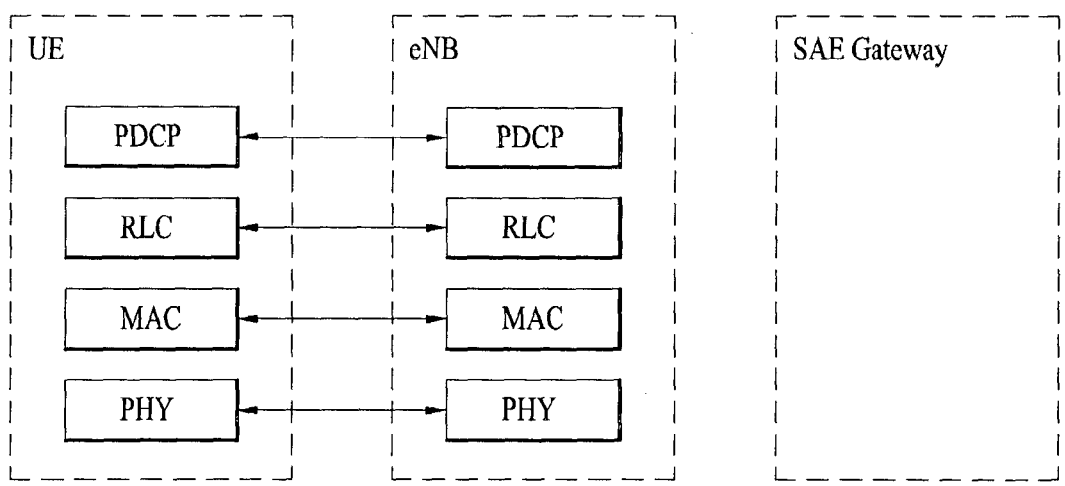
(b) user - plane protocol stack

RADIO LINK FAILURE REPORTING IN A SYSTEM USING MULTIPLE CELLS

TECHNICAL FIELD

The present invention relates to a wireless communication system, and more particularly, to radio link failure reporting scheme in the wireless communication system using multiple cells of multiple nodes.

BACKGROUND ART

As an example of a wireless communication system to which the present invention is applicable, a 3rd generation partnership project (3GPP) long term evolution (LTE) communication system will be schematically described.

FIG. 1 is a block diagram illustrating network structure of an evolved universal mobile telecommunication system (E-UMTS).

The E-UMTS may be also referred to as an LTE system. The communication network is widely deployed to provide a variety of communication services such as voice (VoIP) through IMS and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

An eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signalling to eNodeBs 20, NAS signalling security, AS Security control, Inter CN node signalling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBRFor clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

Although wireless communication technology has been developed to LTE over a wideband code division multiple access (WCDMA), the demands and expectations of users and service providers are on the rise. In addition, considering other radio access technologies under development, new technological evolution is required to secure high competitiveness in the future. Wider bandwidth, decrease in cost per bit, increase in service availability, flexible use of frequency bands, a simplified structure, an open interface, appropriate power consumption of UEs, and the like are required.

DISCLOSURE

Technical Problem

Accordingly, the present invention is directed to methods for effectively reporting radio link failure and apparatuses therefor that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for a first base station to operate in a wireless communication system is provided. The method comprises: detecting a radio link failure with a user equipment (UE) on a first cell of the first base station, wherein a second cell for the UE is of a second base station, wherein the first base station and the second base station are simultaneously connected with the UE through the first cell and the second cell respectively; and transmitting an indication of the radio link failure with the UE on the first cell to the second base station.

In another aspect of the present invention, a base station devise for operating as a first base station in a wireless communication system is provided. The device comprises: a transceiver adapted to transmit or receive signals over the air; and a processor electrically connected to the transceiver and adapted to control the transceiver to: detect a radio link failure with a user equipment (UE) on a first cell of the first base station, wherein a second cell for the UE is of a second base station, wherein the first base station and the second base station are simultaneously connected with the UE through the first cell and the second cell respectively; and control the transceiver to transmit an indication of the radio link failure with the UE on the first cell to the second base station.

Preferably, the wireless communication system may use a Carrier Aggregation (CA) scheme. In this case, the first cell can be a secondary cell (SCell) and the second cell can be a primary cell (PCell).

The second base station may further have a third cell for the UE, and no indication of a radio link failure on the third cell is transmitted.

The first base station may further have a fourth cell for the UE, and a radio link failure on the fourth cell may be detected through the first cell of the first base station. In this case, the first cell may be referred as 'delegate SCell' of the first base station.

The radio link failure may be detected by receiving N consecutive channel quality related reporting from the UE that is less than a threshold value, wherein the 'N' is a certain number. Or, the radio link failure may be detected by receiving a notification that the radio link failure occurs from the UE.

Preferably, the indication of the radio link failure may comprise one or more of an identifier of a specific cell where the radio link failure occurred, frequency information that the specific cell used, an identifier of the UE that the radio link failure was detected, a case of the radio link failure, and a channel quality related reporting value which triggers the radio link failure.

The second cell may be deactivated by the second base station, when the indication of the radio link failure is provided. And, a fifth cell of the first base station may be added to serve the UE by the second base station, when the indication of the radio link failure is provided, if necessary.

Advantageous Effects

According to embodiments of the present invention, the network and the user equipment can efficiently transmit and receive signals in a wireless communication system.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a diagram showing a control plane and a user plane of a radio interface protocol between a UE and an E-UTRAN based on a 3GPP radio access network standard.

BEST MODE

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
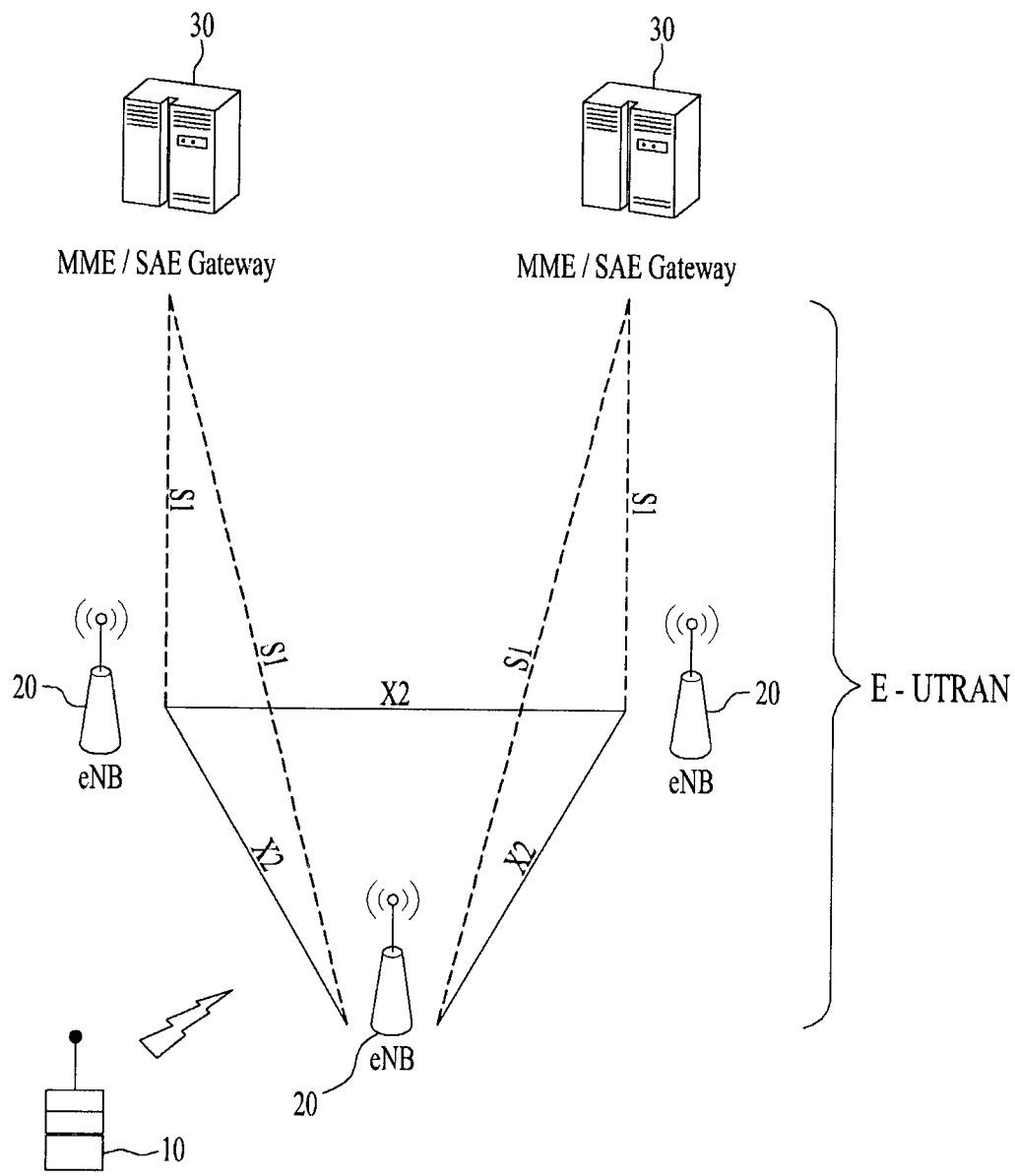
FIG. 1 is a block diagram illustrating network structure of an evolved universal mobile telecommunication system (E-UMTS).
Figure 2:
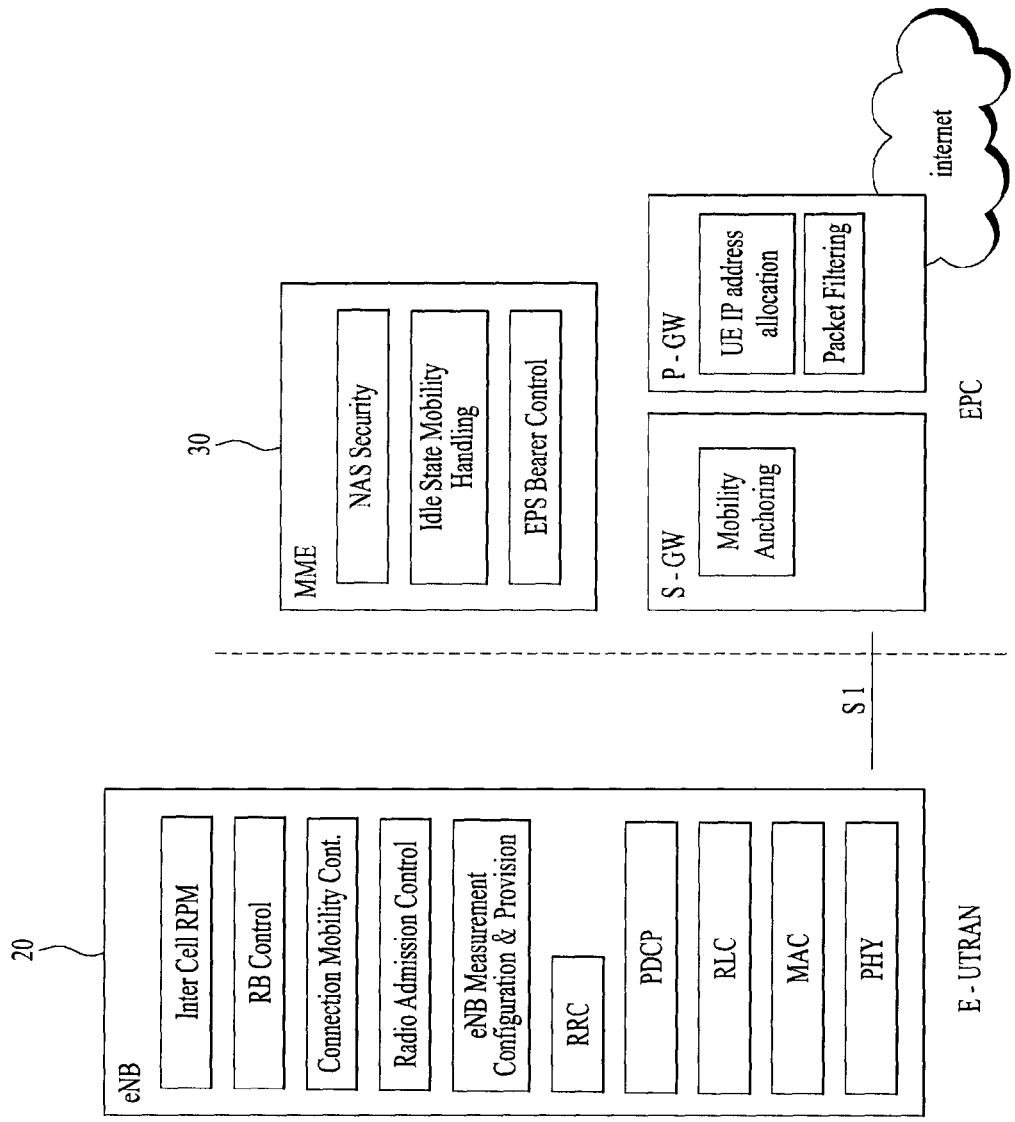
FIG. 2 is a block diagram showing architecture of a typical E-UTRAN and a typical EPC.

FIG. 2 is a block diagram showing architecture of a typical E-UTRAN and a typical EPC.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state.

In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

FIG. 3 is a diagram showing a control plane and a user plane of a radio interface protocol between a UE and an E-UTRAN based on a 3GPP radio access network standard.

The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
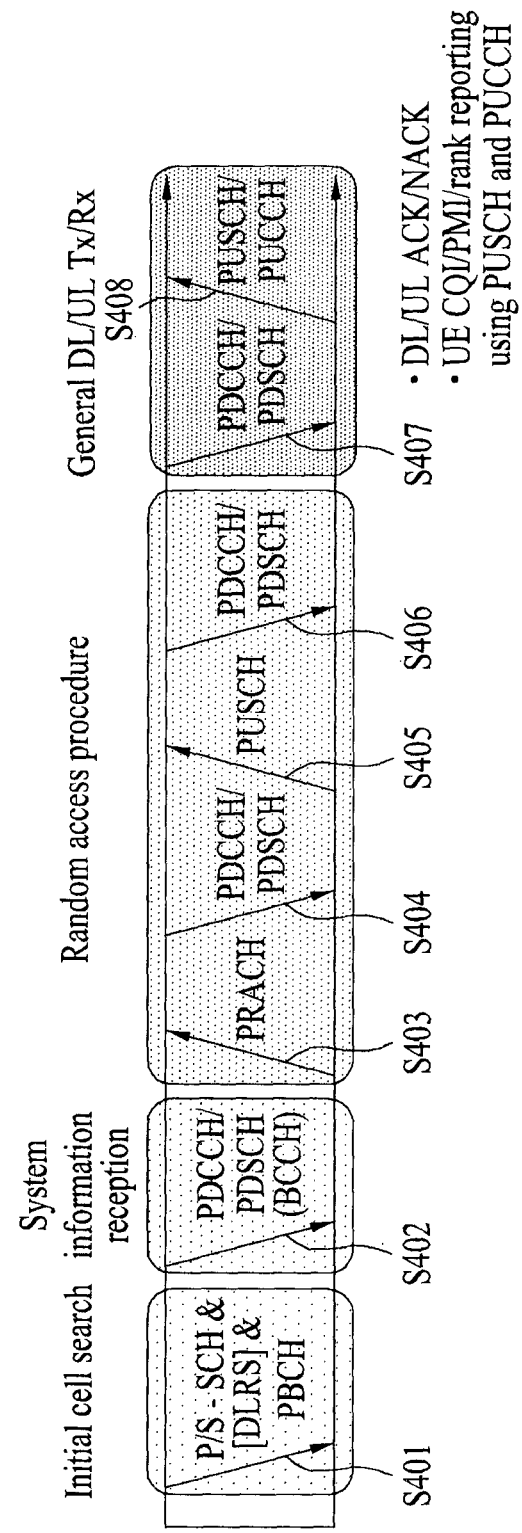
FIG. 4 is a diagram showing physical channels used in a 3GPP system and a general signal transmission method using the same.

FIG. 4 is a diagram showing physical channels used in a 3GPP system and a general signal transmission method using the same.

When a UE is powered on or enters a new cell, the UE performs an initial cell search operation such as synchronization with an eNB (S401). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S402).

When the UE initially accesses the eNB or has no radio resources for signal transmission, the UE may perform a random access procedure (RACH) with respect to the eNB (steps S403 to S406). To this end, the UE may transmit a specific sequence as a preamble through a physical random access channel (PRACH) (S403) and receive a response message to the preamble through the PDCCH and the PDSCH corresponding thereto (S404). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S408), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 5:
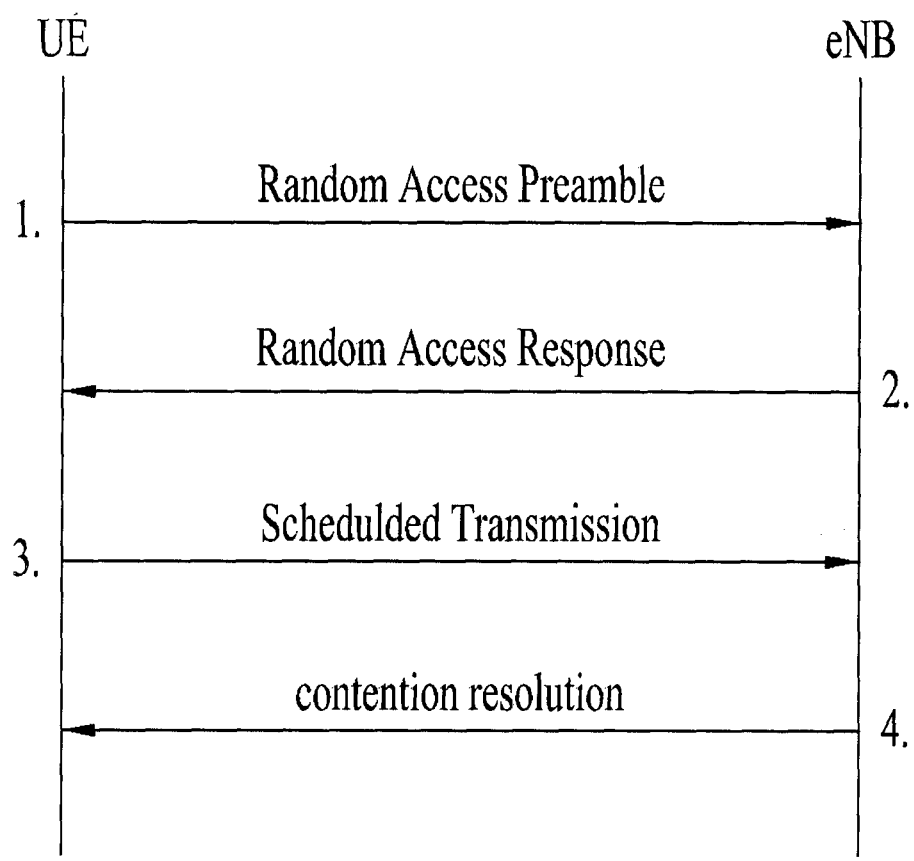
FIG. 5 is a diagram explaining a random access procedure in LTE system.

FIG. 5 is a diagram explaining a random access procedure in LTE system.

When a UE wishes to access the network and determines a message to be transmitted, the message may be linked to a purpose and a cause value may be determined. The size of the ideal message number 3 illustrated in FIG. 8 may also be determined by identifying all optional information and different alternative sizes, such as by removing optional information, or an alternative "scheduling request" message may be used.

The UE acquires necessary information for the transmission of the preamble. In response to the random access preamble transmission by the UE (Step 1), eNB may respond by transmitting a random access response (Step 2). The transmission by a UE is not a scheduled one, so there might be a contention with another UE. Therefore, the random access procedure further comprises contention resolution procedure by transmitting a message 3 (msg3) as scheduled transmission by the UE (Step 3) and receiving contention resolution message from eNB (Step 4).

Contention Resolution is based on either C-RNTI on PDCCH of the PCell or UE Contention Resolution Identity on DL-SCH. According to a LTE standard, this contention resolution is controlled based on a MAC contention resolution timer (mac-ContentionResolutionTimer).

Once Msg3 is transmitted, the UE may start mac-ContentionResolutionTimer and restart mac-ContentionResolutionTimer at each HARQ retransmission. After that, regardless of the possible occurrence of a measurement gap, the UE may monitors the PDCCH until mac-ContentionResolutionTimer expires or is stopped.

If notification of a reception of a PDCCH transmission is received from lower layers, and if appropriate contention resolution message is received, the UE may stop mac-ContentionResolutionTimer and consider this Random Access procedure successfully completed.

However, before the above mentioned event occurs, if mac-ContentionResolutionTimer expires, the UE may consider the Contention Resolution not successful.

Hereinafter, radio link failure reporting scheme in a wireless communication system using multiple cells of multiple nodes is explained.

In order to support wider bandwidth, aggregation of several carriers is considered. This is so called 'carrier aggregation (CA)'. Each carrier of aggregated carriers is referred to as 'component carrier (CC)'. For each UE which supports CA, a proper set of CCs is configured, depending on the capability of the UE. The UE may simultaneously receive or transmit signals via one or multiple component carriers.

Figure 6:
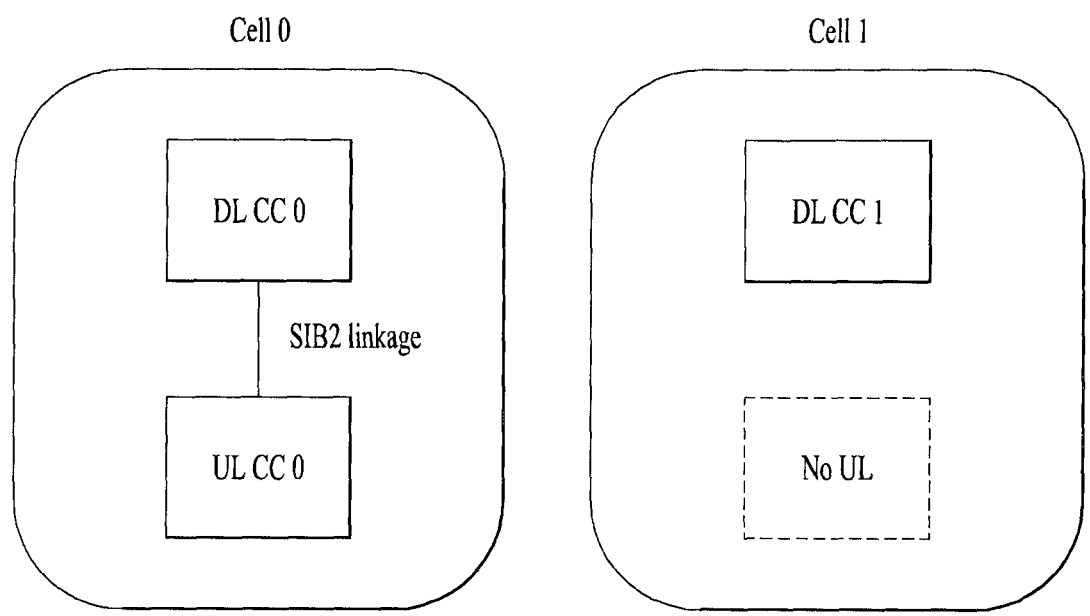
FIG. 6 shows a concept of multiple cells according to one embodiment of the present invention.

FIG. 6 shows a concept of multiple cells according to one embodiment of the present invention.

In accordance with this embodiment, each downlink (DL) CC and each uplink (UL) CC can be linked together by SIB2 linkage and forms one cell (cell 0 in FIG. 6). But, a cell can have only DL CC (cell 1 in FIG. 6). It is assumed that a cell should have at least one DL CC.

Multiple cells (cell 0 and cell 1) can simultaneously serve one UE. Preferably, one of multiple cells simultaneously serving one UE can be a Primary Cell (PCell) while other cells serve as Secondary Cells (SCells). By this distingtion, controlling operation of SCells can be done via PCell. For example, addition, deletion, activation or deactivation of SCells can be performed via PCell.

Wireless communication environment is vulnerable to interference or rapid fluctuation of signal level. In order to stay on the communication link with high quality, it is quite important for UE to monitor the quality or status of communication link.

To this end, UE continues to monitor the radio link status to see if the link is still available for its service. When UE experiences some serious problem in either downlink (DL) or uplink (UL), UE declares radio link failure (RLF). For example, if UE detects physical layer problems for some time (downlink failure) or if UE is indicated a random access problem from MAC (downlink or uplink failure), or if UE is indicated that maximum retransmission is reached (uplink failure), then the UE declares radio link failure, that is, the communication link of the cell over the carrier is assumed to be no more available.

If UE declares the radio link failure, the UE tries to recover from the failure by initiating RRC connection re-establishment. The UE would temporarily lose its connectivity until the completion of connection re-establishment. The time for which communication link is unavailable may be significant since the connection re-establishment procedure includes several procedures like cell selection, acquisition of system information, and random access procedure in sequence. Moreover, dedicated configuration for, e.g., bearer configuration or measurement configuration and so on, for the UE also need to be following the connection re-establishment procedure. This would require additional time as well.

Referring back to FIG. 6, if cell 0 (PCell) and cell 1 (SCell) are of the same node B, RLM (Radio Link Monitoring) for a SCell is not needed because it can be done through the CQI/SRS report for the SCell. As a result, RLM is performed only for the PCell, and a RLF is declared when the channel quality of the PCell is poor.

However, in case inter-site carrier aggregation is configured, some SCells and a PCell belong to different eNB. As a result, though RLF is occurred in such a SCell, the PCell cannot know it. So network may make no effort to recover the radio link and the corresponding UE may suffer from throughput decline.

Figure 7:
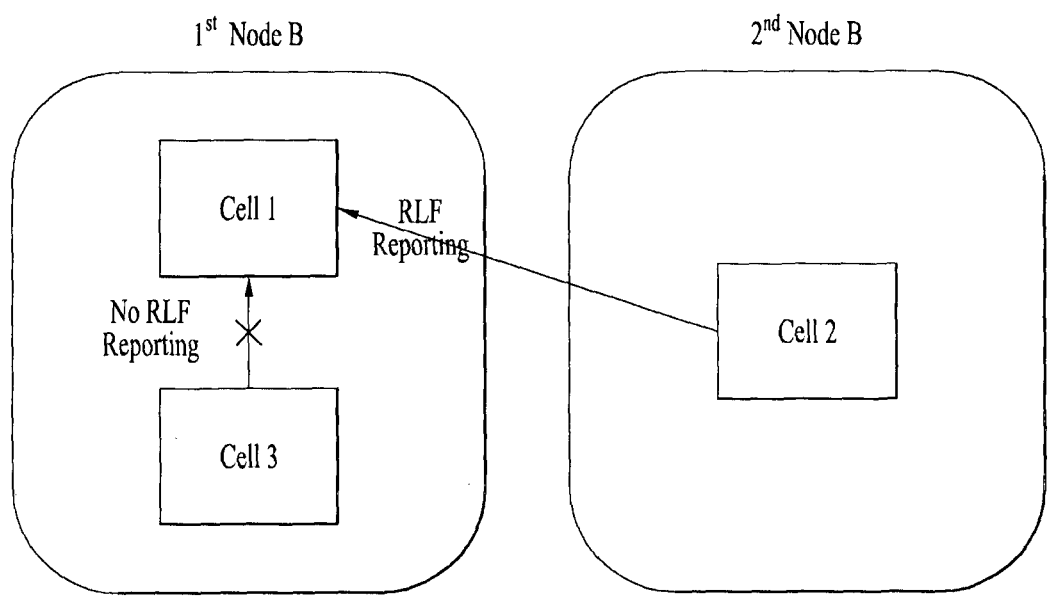
FIG. 7 shows an embodiment of the present invention for RLF reporting.

FIG. 7 shows an embodiment of the present invention for RLF reporting.

As shown in FIG. 7, multiple cells (cells 1, 2 and 3) serving one UE can be of different eNBs ($1^{st}$ Node B and $2^{nd}$ Node B). According to the present embodiment, $2^{nd}$ eNB may detect RLF with a UE on cell 2 served by it, while cells 1 and 3 for the same UE are served by $1^{st}$ eNB. In this case, cells 1, 2 and 3 are simultaneously connected (e.g. RRC connected) with the same UE. This simultaneous connection with the same UE is distinguished from a soft handover situation from one cell to another cell, where only one RRC connection with the UE is established. When, the $2^{nd}$ eNB detects RLF on cell 2 with the UE, the $2^{nd}$ eNB may report this to the $1^{st}$ eNB. By this way, the $1^{st}$ eNB can be informed of RLF on cell 2 of different eNB.

In contrary, the RLF on cell 3 need not be reported, since the $1^{st}$ eNB may be informed of it without this separate reporting.

Preferably, cell 1 can serve as PCell while cells 2 and 3 serve as SCells, but it is not necessary to limit the scope of the invention.

When, the $1^{st}$ eNB is informed of the RLF of cell 2, the $1^{st}$ eNB may perform necessary actions including deactivation of cell 2 and addition of another cell, if necessary.

According to one embodiment of the present invention, if inter-site SCell declares radio link failure, the inter-site SCell will send RLF indication to the PCell in order to let the PCell know things about the unavailable SCell. The above inter-site SCell is a serving cell which has different physical node from a PCell. The above SCell includes all serving cells that UE doesn't perform RLM measurement.

Inter-site SCell may declare that RLF occurs, when
- the inter-site SCell receives one or N consecutive CQI/SRS report that the results are less than threshold value from UE, and/or
- the inter-site SCell receives notification that RLF is detected from UE.

The above RLF indication can contain following information: inter-site SCell identifier, frequency information, identifier of UE that RLF was detected, RLF cause, and/or CQI/SRS result which triggers RLF declaration.

The RLF indication according to this embodiment can be transmitted to the PCell directly using X2 interface, or can be transmitted via core networks. As stated above, the PCell may release or deactivate the SCell which sent the RLF indication and configures another SCell for UE.

Figure 8:
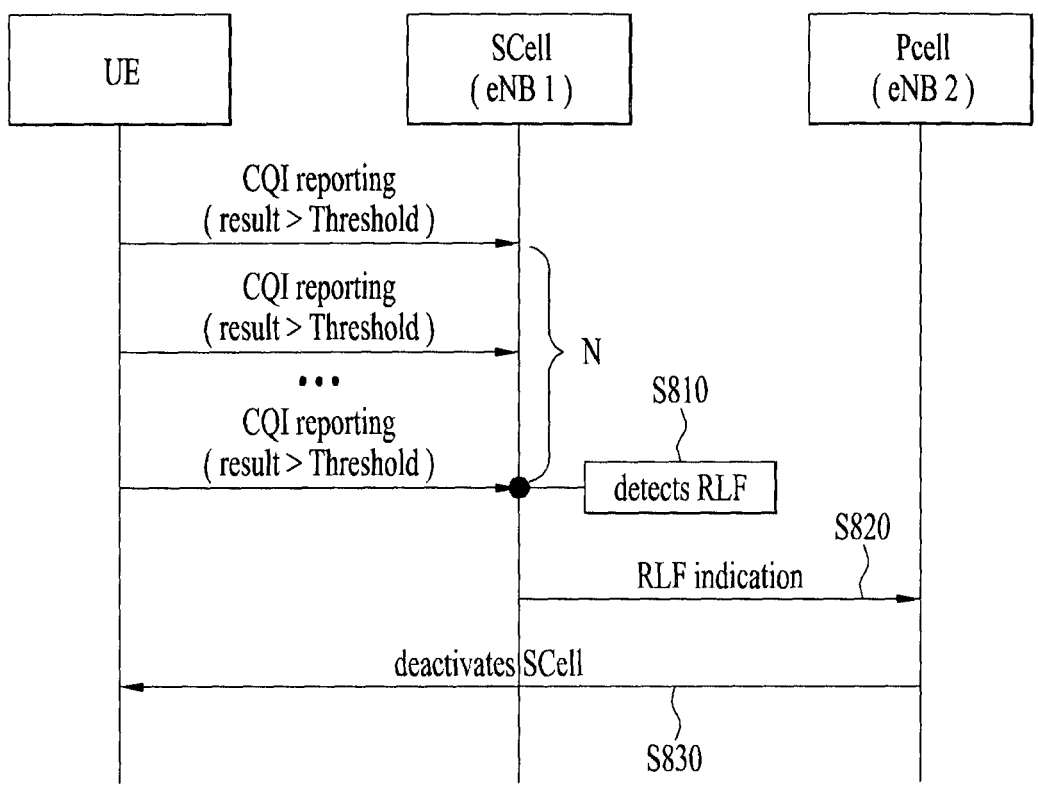
FIG. 8 shows a procedure according to one preferred embodiment of the present invention.

FIG. 8 shows a procedure according to one preferred embodiment of the present invention.

As shown in FIG. 8, this embodiment supposes a situation where PCell and SCell simultaneously connected to a UE are of different eNBs. Specifically, SCell connected to the UE is of eNB 1 and PCell connected to the UE is of eNB 2

When SCell which belong to different eNB from PCell receives N consecutive CQI results which are less than threshold value from UE, the SCell of the present embodiment may declare RLF (S810).

In this case, the SCell may send RLF indication to PCell (S820). This may be contrary to a case where SCell and PCell are of the same eNB, as stated above.

Upon receiving the RLF indication, PCell of this embodiment may deactivate corresponding SCell and configures substitutive SCell, if necessary (S830).

Figure 9:
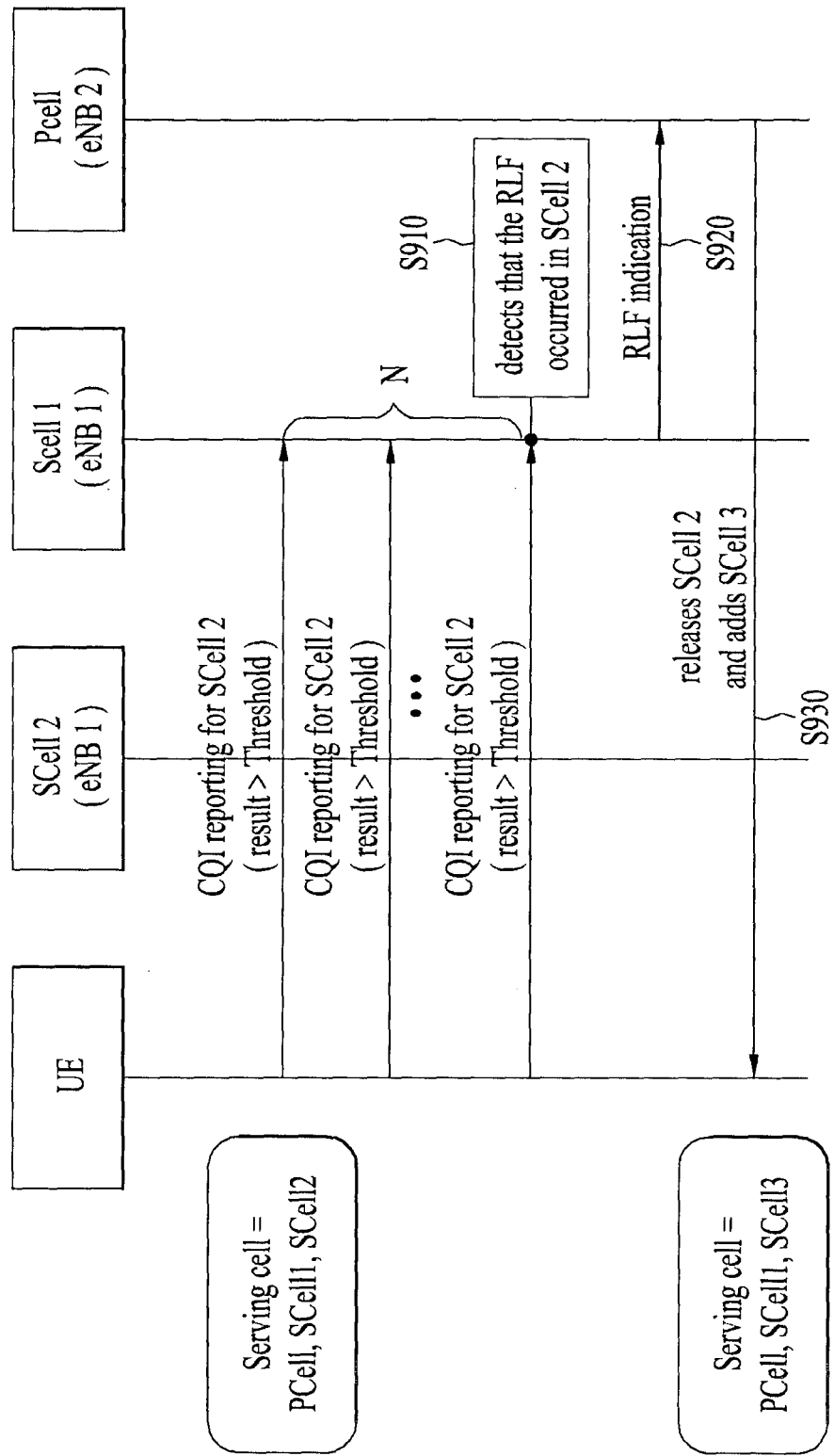
FIG. 9 shows a procedure according to another preferred embodiment of the present invention.

FIG. 9 shows a procedure according to another preferred embodiment of the present invention.

In this embodiment, we propose a concept of 'delegate SCell.' As exemplified in FIG. 9, multiple SCells (SCell 1 and SCell 2) may be of eNB 1 while PCell is of different eNB (eNB 2). In this case, one of multiple SCells may serve as delegate SCell in eNB 1 and it takes charge of reporting RLF on SCells of eNB 1.

In this embodiment, the CIQ/SRS report for a certain SCell may be reported to the delegate SCell not to the certain SCell. In this case, when RLF occurs between a certain SCell and a UE, the delegate SCell detects RLF and sends RLF indication instead of a certain SCell.

Referring back to FIG. 9, SCell 1 which belongs to different eNB from PCell may receive N consecutive CQI/SRS report for SCell 2 and the results are less than threshold value. In this example, SCell serves as delegate SCell of 3 eNB 1.

Based on the above CQI/SRS reporting, SCell 1 may declare RLF on SCell 2 (S910). In this embodiment, inter-site delegate SCell may consider that RLF occurs on a certain SCell when a certain condition is met. The condition can be:

Reception of one or N consecutive CQI/SRS report that the results are less than threshold value from UE.

Reception of notification that RLF is detected from UE.

In this embodiment, the delegate SCell may send RLF indication to the PCell (S920). The RLF indication contains identifier of problematic SCell where RLF occurred. Preferably, the above RLF indication can contain following information:

identifier of problematic SCell where RLF occurred, and/or frequency information that the problematic SCell used, and/or identifier of UE that RLF was detected, and/or RLF cause, and/or CQI/SRS result which triggers RLF detection.

Upon receiving the RLF indication, the PCell may release SCell2 and configure a new SCell for UE (S930).

Figure 10:
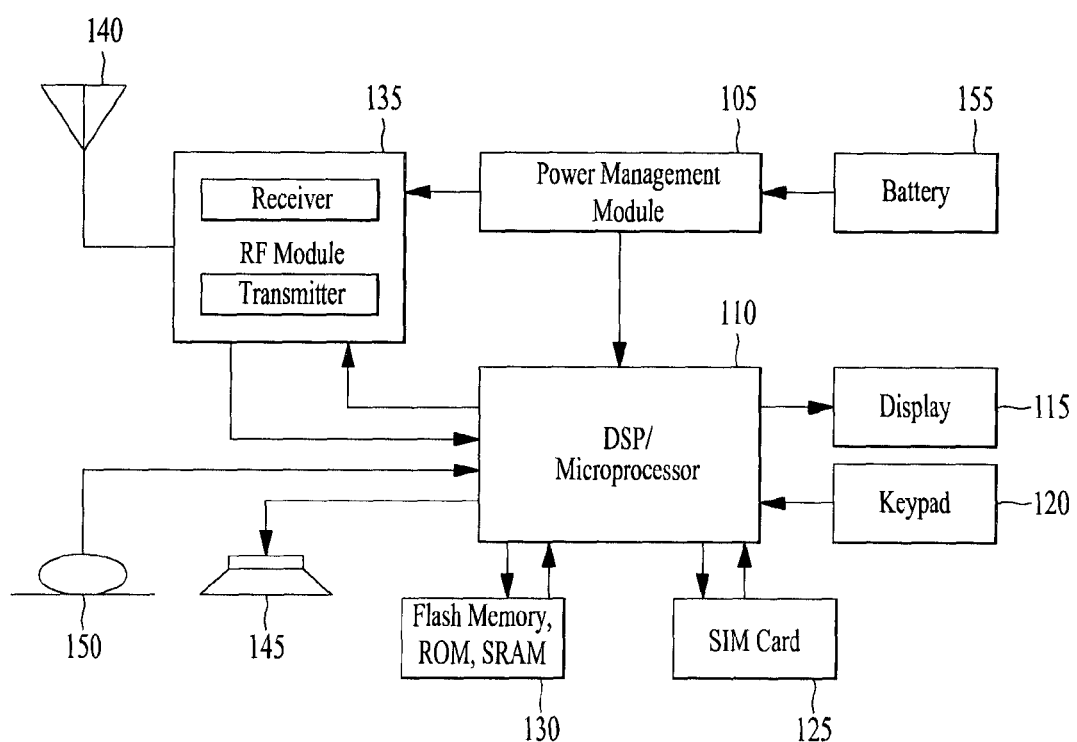
FIG. 10 is a block diagram of a communication apparatus according to an embodiment of the present invention.

FIG. 10 is a block diagram of a communication apparatus according to an embodiment of the present invention.

The apparatus shown in FIG. 10 can be an eNB adapted to perform the above RLF reporting, but it can be any apparatus for performing the same operation.

As shown in FIG. 10, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, the microprocessor (110) may be adapted to control the transceiver (135) to detect a radio link failure with a user equipment (UE) on a first cell of the first base station. As stated above, a second cell for the UE is of a second base station, wherein the first base station and the second base station are simultaneously connected with the UE through the first cell and the second cell respectively. When the RLF is detected, the processor (135) may control the transceiver to transmit an indication of the radio link failure with the UE on the first cell to the second base station.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

While the above-described method has been described focused on an example applied to the 3GPP LTE system, the present invention is applicable to a variety of wireless communication systems in addition to the 3GPP LTE system.

The invention claimed is:

1. A method for a first base station (BS) to operate in a wireless communication system, the method comprising:

detecting, by a first secondary cell (SCell) of the first BS, a radio link failure (RLF) on the first SCell, while the first BS and a second BS having a primary cell (PCell) are simultaneously respectively connected with a user equipment (UE) through the first SCell and the PCell; and transmitting, by the first SCell of the first BS to the PCell of second BS, an indication of the RLF on the first SCell, wherein a second SCell is newly configured for the UE by the PCell of the second BS when the PCell of the second BS receives the indication.

2. The method of claim 1, wherein the first SCell of the first BS is released or deactivated by the PCell of the second BS when the PCell of the second BS receives the indication.

3. The method of claim 1, wherein:

the second BS further has a third SCell configured for the UE; and no indication of an RLF on the third SCell of the second BS is transmitted.

4. The method of claim 1, further comprising:

detecting, by the first SCell of the first BS, an RLF on a fourth SCell of the first BS configured for the UE; and transmitting, by the first SCell of the first BS to the PCell of the second BS, an indication of the RLF on the fourth SCell of the first BS.

5. The method of claim 1, wherein the RLF on the first SCell of the first BS is detected when the first SCell of the first BS receives N consecutive channel quality related reporting from the UE that is less than a threshold value, where N is a certain number.

6. The method of claim 1, wherein the RLF on the first SCell of the first BS is detected when the first SCell of the first BS receives a notification indicating that the RLF on the first SCell of the first BS occurs from the UE.

7. The method of claim 1, wherein the indication comprises one or more of: an identifier of the first SCell of the first BS, frequency information that the first SCell of the first BS used, an identifier of the UE, a cause of the RLF on the first SCell of the first BS, and a channel quality related reporting value that triggers the RLF on the first SCell of the first BS.

8. A base station device for operating as a first base station (BS) in a wireless communication system, the device comprising:

a transceiver configured to transmit or receive signals over the air;

a processor electrically connected to the transceiver and configured to control the transceiver to:

detect, by a first secondary cell (SCell) of the first BS, a radio link failure (RLF) on the first SCell, while the first BS and a second BS having a primary cell (PCell) are simultaneously respectively connected with a user equipment (UE) through the first SCell and the PCell; and transmit, by the first SCell of the first BS to the PCell of second BS, an indication of the RLF on the first SCell, wherein a second SCell is newly configured for the UE by the PCell of the second BS when the PCell of the second BS receives the indication.

9. The device of claim 8, wherein the first SCell of the first BS is released or deactivated by the PCell of the second BS when the PCell of the second BS receives the indication.

10. The device of claim 8, wherein:
   the second BS further has a third SCell configured for the UE; and
   no indication of an RLF on the third SCell of the second BS is transmitted.

11. The device of claim 8, wherein the processor further controls the transceiver to:
   detect, by the first SCell of the first BS, an RLF on a fourth SCell of the first BS configured for the UE; and
   transmit, by the first SCell of the first BS to the PCell of the second BS, an indication of the RLF on the fourth SCell of the first BS.

12. The device of claim 8, wherein the indication comprises one or more of: an identifier of the first SCell of the first BS, frequency information that the first SCell of the first BS used, an identifier of the UE, a cause of the RLF on the first SCell of the first BS, and a channel quality related reporting value that triggers the RLF on the first SCell of the first BS.

* * * * *